United States Patent [19]
Frei et al.

[11] 3,722,578
[45] Mar. 27, 1973

[54] PRESSURE MAINTAINING DEVICE AND METHOD FOR PRESSURIZED WATER REACTORS

[75] Inventors: Gerhard Frei; Maximillian Hintergraber, both of Erlangen, Germany

[73] Assignee: Siemens Aktiengesellschaft, Berlin, Germany

[22] Filed: July 16, 1970

[21] Appl. No.: 55,352

[30] Foreign Application Priority Data

July 19, 1969 Germany.....................P 10 36 844.6

[52] U.S. Cl. ..........................165/1, 165/60, 165/107
[51] Int. Cl. .................................................F24f 3/14
[58] Field of Search.............165/1, 105, 106, 107, 60

[56] References Cited

UNITED STATES PATENTS 3,114,414   12/1963   Judd......................................165/105

*Primary Examiner*—Charles Sukalo
*Attorney*—Curt M. Avery, Arthur E. Wilfond, Herbert L. Lerner and Daniel J. Tick

[57] ABSTRACT

Method of automatically maintaining pressure in a pressure maintaining device of a pressurized water reactor includes spraying into a steam chamber of the pressure maintaining device in response to increase in pressure in the device or to increase in power output of the reactor, at least a partial flow of water flowing in a pressure water line from the reactor to a steam generator, and additionally spraying into the steam chamber continuously and constantly a lesser flow of water flowing in a line from the steam generator back to the reactor; and device for carrying out the method.

10 Claims, 3 Drawing Figures

PRESSURE MAINTAINING DEVICE AND METHOD FOR PRESSURIZED WATER REACTORS

Our invention relates to method of automatically regulating pressure maintenance in a pressure maintaining device of a pressurized water nuclear reactor and to device for carrying out the method.

It has been known, heretofore, to regulate or control the pressure in a primary circulatory loop of a nuclear reactor within specific limits with the aid of a pressure maintaining device. If a variation in the reactivity of the reactor occurs or a coolant pump fails, the coolant temperature in the primary loop changes and, thereby, the density of the coolant changes. The volume and pressure deviations associated therewith must be picked up or intercepted by the pressure maintaining device and compensated for or balanced. Conventionally, electric heating elements are additionally provided in the lower part of the pressure maintaining device.

If the density of the coolant in the primary loop increases, a pressure reduction occurs which automatically switches on the heating elements. As a result thereof, a quantity of steam is generated which prevents a further drop in pressure.

If the coolant density in the primary loop of the reactor decreases, an excess or over-pressure is formed in the pressure maintaining device which is reduced in short order by turning on spray nozzles in the pressure maintaining device.

In accordance with heretofore known methods of regulating the pressure maintenance in devices of this general type, the supply line to the spray nozzles is connected to the coolant water line extending from the steam generator to the reactor proper, at a location of that line upstream of the feed pump i.e. connected to the so-called "cold" line of the primary circulatory loop of the reactor. Since relatively cold water is sprayed into the pressure maintaining device through this cold line when a pressure increase occurs, the temperature of the water in the pressure maintaining device drops too much so that, upon the occurrence of a subsequent pressure decrease before the water in the pressure maintaining device has begun to vaporize, too great a reduction in pressure of the entire system is produced. In addition thereto, this known "cold" line which supplies the spray nozzles has control or regulating devices and armatures that are costly and susceptible to breakdown. Furthermore, a blow-off tank is generally also required wherein part of the steam is blown off when a pressure increase occurs. This blow-off, moreover, results in an additional energy loss.

It is accordingly an object of our invention to provide pressure maintaining device for pressurized water reactors which largely operates automatically and dispenses with costly valves and regulating or controlling devices.

It is also an object of our invention to provide a method of operating such pressure maintaining device which avoids the disadvantages of the previously known methods of this general type.

With the foregoing and other objects in view, I provide in accordance with my invention, method which comprises spraying into a steam chamber of the pressure maintaining device, in response to increase in pressure in the device or to increase in power output of the reactor, at least a partial flow of water flowing in a pressure water line from the reactor to a steam generator, and additionally spraying into the steam chamber continuously and constantly a lesser flow of water flowing in a line from the steam generator back to the reactor.

By employing a partial flow of coolant from the "hot" coolant line extending from the reactor to the steam generator for spraying the same into the vaporizing chamber of the pressure maintaining device, the temperature of the medium in the pressure maintaining device is not reduced as sharply as in the heretofore known methods of this general type, so that no excessive pressure deviations will occur during a pressure drop until the pressure is newly regulated or controlled. Moreover, varying boron concentration occurring in the primary circulatory loop and in the pressure maintaining device is equalized or compensated for by the additional continuous spraying as well as a sharper pressure drop is attained when too great a pressure rise occurs.

In accordance with the device for carrying out the method of the invention, I provide in an equalizing line extending between the primary circulatory loop of the nuclear reactor and the pressure maintaining device, a throttling orifice and a check valve connected parallel to one another and, between the throttling orifice and the primary circulatory loop, there is connected a line containing a check valve and terminating in a vaporizing chamber provided in the pressure maintaining device, and including spraying means connected to the last-mentioned line within the vaporizing chamber.

By suitably adjusting the throttling orifice or valve, the pressure drop between the primary circulatory loop and the pressure maintaining device is utilizable for attaining a metered spraying of coolant by the spraying means within the pressure maintaining device.

In accordance with further features of another embodiment of the device of our invention, we provide for the equalizing line to project into the pressure maintaining device and to extend along the entire axial length of the pressure maintaining device. In the vicinity of a vaporizing chamber provided in the pressure maintaining device, the equalizing line is formed with spray openings therein or with spray nozzles and, in the vicinity of a water chamber of a pressure maintaining device, the equalized line is provided with at least one water outlet opening which is automatically closeable when a pressure increase occurs. In accordance with a further feature of the invention and in order to reduce the spraying action, the pressure maintaining device in the vicinity of the water chamber thereof and of a lower region of the vaporizing chamber thereof has a smaller diameter than that provided in the region of the upper vaporizing chamber thereof.

Other features which are considered as characteristic for the invention are set forth in the appended claims.

Although the invention is illustrated and described herein as pressure maintaining device and method for pressurized water reactors, it is nevertheless not intended to be limited to the details shown, since various modifications and structural changes may by made therein without departing from the spirit of the invention and within the scope and range of equivalents of the claims.

The invention, however, together with additional objects and advantages thereof will be best understood from the following description when read in connection with the accompanying drawings, in which:

FIG. 1b is a diagrammatic fragmentary view of a modification of FIG. 1a and;

Figure 1A:
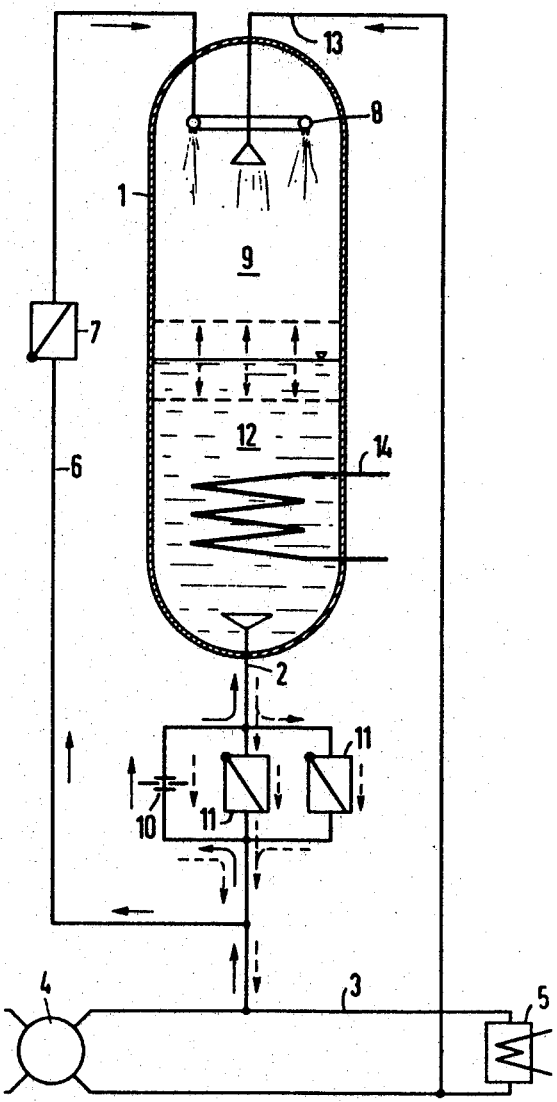
FIG. 1a is a diagrammatic view of a pressure maintaining system wherein a pressure maintaining device is connected to an equalizing line extending from a primary circulatory loop of a nuclear reactor and having a branching line terminating in a spray member for the pressure equalizing device.

Referring now to the drawing and first particularly to FIG. 1a thereof, there is shown a pressure maintaining device 1 constructed generally as a cylindrical pressure vessel which is connected by equalizing line 2 with a so-called "hot" line 3 of a primary circulatory loop from a nuclear reactor 4 to a steam generator 5 proper. According to the embodiment in FIG. 1a, a spray line 6 branches off the equalizing line 2 and is provided with a check valve 7. The spray line 6 terminates at a spray device 8 located in an upper vaporizing chamber 9 of the pressure maintaining device 1. A throttle 10 and two check valve armatures 11 are connected in parallel in the equalizing line 2 between the location at which the spray line 6 branches off therefrom and the pressure maintaining device 1.

When an expansion in volume occurs in the primary circulatory loop, part of the water flowing through the equalizing line 2 from the hot line 3 to the pressure maintaining device 1 passes through the throttle 10 directly into a water chamber 12 formed in the lower part of the pressure maintaining device 1 as shown in FIG. 1a. The remaining part of the flowing water is sprayed through the spray line 6 and spray device 8 into the vaporizing chamber 9. By utilizing the pressure drop which is produced as a result of volume expansion occurring between the primary circulatory loop and the pressure maintaining device, automatic spraying of the water can be attained to effect condensation of part of the steam or vaporizing liquid in the vaporizing chamber 9 and thereby a reduction in pressure by suitably dimensioning resistances of the throttle 10.

When a volume contraction occurs in the primary circulatory loop, in contrast to the foregoing, the check valves 11 in the equalizing line 2 open so that the water level indicated by the small triangular symbol in FIG. 1a, can sink lower in the pressure maintaining device 1. Fine regulation or control of the pressure is effected by a continuous spraying of water traveling through a line 13 which branches from the so-called "cold" line of the primary circulatory loop, as well as by suitably heating the water by means of a heating coil 14 or the like in the water chamber 12 of the pressure maintaining device 1. The slight continuous spraying effected through the line 13 is also required to equalize the somewhat varying boron concentration of the water in the pressure maintaining device and in the primary circulatory loop.

Figure 1B:
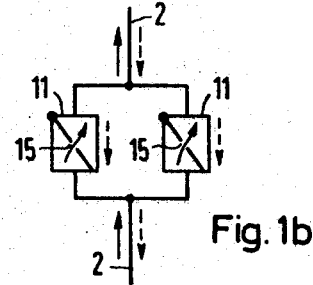

Instead of a throttling valve 10, it is also possible, as shown in the modification of FIG. 1b, to provide the check valves 11 with a throttling bore 15 so that water flowing in the direction of the solid line arrows in FIG. 1b are suitably throttled. When a volume contraction occurs, i.e., when the water flows out of the pressure maintaining device in the direction of the dotted arrows, the check valves 11 open so that the water can flow off without hindrance.

Figure 2:
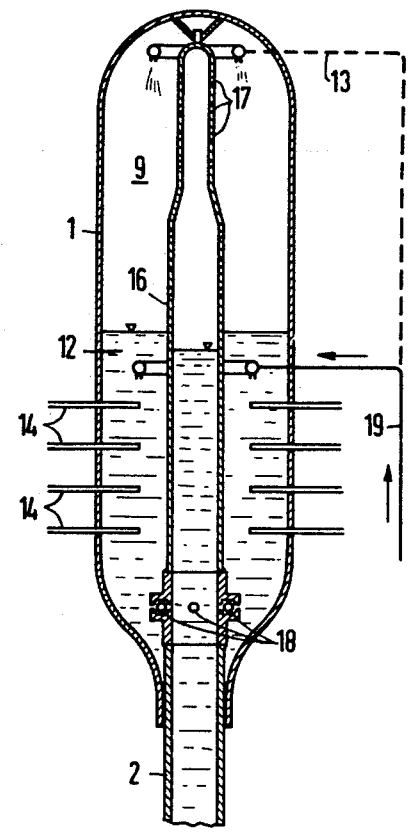
FIG. 2 is a diagrammatic view of another embodiment of the pressure maintaining device of FIG. 1a wherein an equalizing line extends from the lower to the upper end thereof.

In another embodiment of the invention as shown in FIG. 2, the equalizing line 2 extends from the non-illustrated "hot" line of the primary circulatory loop but, contrary to the embodiment of FIG. 1a, does not terminate at the lower end of the pressure maintaining vessel 1 but rather is elongated and extends inwardly over the entire elevation of the pressure maintaining device. This elongation 16 is provided in the upper portion thereof as shown in FIG. 2, that is in the vicinity of the vaporizing or steam chamber 9, with spray opening 17 or inserted spray nozzles, while, in the lower water guiding vicinity 12 of the pressure maintaining device, several outlet openings 18 are provided which are closed by conventional ball valves. In addition, in the embodiment of FIG. 2, there are provided conventional heating rods 14 as well as a line 19 which terminates in a continuous trickling device located in the water chamber 12 and operating at the outlet temperature of the steam generator which is not illustrated in FIG. 2.

If the pressure in the inner chamber of the pressure maintaining device increases because of volume expansion of the water in the primary circulatory loop the ball of the ball valves located at the outlet openings 18 is pressed forward of the outlet openings 18 due to the pressure differences between the inner and outer chambers so that the in-flowing water is sprayed through the spray nozzles 17 into the vaporizing chamber 9 of the pressure maintaining device.

If, however, when spraying the entire in-flowing quantity of water, the spraying action is somewhat excessive, (independently of the construction of the installation or system) for assuring constant maintenance of the pressure, it is sufficient for a part of the outlet openings 18, for example, to be closed by balls so that part of the water is conducted directly into the water chamber 12. A reduction in the spraying action can be achieved for example also by graduation of the spray nozzles 17 within the inner tube 16. Thus, for longer partial load operation, the level of the water in the pressure maintaining device is raised to such a height that the spray nozzles 17 located in the lower part of the inner tube 16, as viewed in FIG. 2, no longer operate.

In order to attain an acceleration of this water rise, it is also possible, in accordance with the invention, to construct a water-guiding lower part of the pressure maintaining device with a smaller diameter than that of the steam-guiding space.

The essential differences of the afordescribed pressure maintaining device with respect to the heretofore known devices for carrying out corresponding method is that, on the one hand, no regulateable or controllable spray valves and blowoff sliders having a great susceptibility to trouble are required and, moreover, a blowoff tank for receiving excessive quantities of steam can be dispensed with. Accordingly, no unnecessary energy loss occurs in the entire circulatory loop. This energy loss is caused in pressure maintaining devices of conventional construction due to the following operations: Upon the in-flow of colder water, it mixes with the water in the pressure maintaining device which is at saturation temperature causing a reduction in the energy content. Moreover, an unnecessary compression of the steam in the steam chamber and accordingly an increase in pressure occur. This energy increase must again be destroyed by spraying into the pressure maintaining device the coldest possible water at the steam generator outlet temperature in order to reduce the pressure as rapidly as possible. By using water flowing out of the hot line of the primary loop of the pressure maintaining device as a spray, no great temperature deviations occur in the pressure maintaining device proper. This means that also when a pressure reduction occurs due to a very rapid vaporization of the water, the pressure is regulated or controlled more rapidly than has been possible with the heretofore known methods and apparatus of this general type. Accordingly, a maximum of energy remains in the pressure maintaining device so that the required heating power for a pressure reduction can be markedly reduced.

By means of the afordescribed method and the embodiments of the device for carrying out the method, a finely metered and completely automatic regulation or control of the pressure is possible so as to produce an outstanding dynamic behavior of the pressure maintaining device. With respect thereto, the function of the system is completely independent of any pumps for the main coolant.

We claim:

1. Method of automatically maintaining pressure in a pressure-maintaining device of a pressurized water reactor which comprises spraying into a steam chamber of the pressure maintaining device, in response to a respective stimulus denoting a pressure increase in the pressure-maintaining device, at least a partial flow of hot water flowing in a pressurized water line from the reactor to a steam generator, and additionally spraying into the steam chamber continuously and constantly a lesser flow of cold water flowing in a line from the steam generator back to the reactor.

2. Method according to claim 1 wherein the stimulus is the change in pressure per se.

3. Method according to claim 1 wherein the stimulus is a change in power output of the reactor.

4. System for carrying out the method of automatically maintaining pressure in a pressure-maintaining device according to claim 1 comprising an equalizing line branching from the hot side of a primary circulatory loop of a pressurized water reactor and connected to the pressure-maintaining device, throttling means and at least one check valve connected in parallel in said equalizing line upstream of the pressure-maintaining device, a first spray line branching from said equalizing line upstream of said throttling means, said line having a check-valve connected therein and terminating in a steam chamber forming part of the pressure-maintaining device, and a second spray line directly leading from the cold side of the primary circulatory loop to the steam chamber.

5. System according to claim 4 including at least two check valves connected in parallel in said equalizing line, said throttling means comprising a throttle opening formed within said check valves.

6. System for carrying out the method of automatically maintaining pressure in a pressure-maintaining device according to claim 1 comprising an equalizing line branching from the hot side of a primary circulatory loop of a pressurized water reactor, said equalizing line extending into and along substantially the entire axial length of the pressure-maintaining device, first spray means provided for said equalizing line, in the vicinity of an upper steam chamber of the pressure-maintaining device, said first spray means being operatively connected to the hot side of the primary circulatory loop, and second spray means located within said pressure-maintaining device and connected to the cold side of the primary circulatory loop, said equalizing line being formed, in the vicinity of a lower water chamber of the pressure-maintaining device, with a water outlet opening automatically closeable in response to pressure increase.

7. System according to claim 6 wherein said spray means comprises spray openings formed in said equalizing line.

8. System according to claim 6 wherein said spray means are in the form of spray nozzles mounted on said equalizing line.

9. System according to claim 6 wherein the pressure-maintaining device in the vicinity of the water chamber thereof and of a lower region of the steam chamber thereof has a smaller diameter than the diameter of the upper region of the steam chamber thereof.

10. System according to claim 6 including a continuous spray line terminating in the water chamber of the pressure-maintaining device.

* * * * *